United States Patent [19]

Choi

[11] Patent Number: 5,270,626

[45] Date of Patent: Dec. 14, 1993

[54] METHOD OF CONTROLLING MULTITASKING EXCAVATOR SYSTEM

[75] Inventor: Ik-Soo Choi, Suweon, Rep. of Korea

[73] Assignee: Samsung Heavy Industries Co., Ltd., Chanwon, Rep. of Korea

[21] Appl. No.: 981,219

[22] Filed: Nov. 25, 1992

[51] Int. Cl.$^5$ .................... G06F 15/46; B25J 9/00
[52] U.S. Cl. .................... 318/561; 318/568; 318/590; 364/191
[58] Field of Search ............ 318/561, 567, 568.1, 318/568.11, 568.17, 568.19, 568.2, 568.23, 590; 364/140, 143, 148, 149, 150, 152, 160, 176, 191; 901/2; 177/147, 25.11, 25.12, 25.13, 25.14, 25.19, 26, 31

[56] References Cited

U.S. PATENT DOCUMENTS

| | | | |
|---|---|---|---|
| 3,636,325 | 1/1972 | Chytil | 235/151 |
| 4,491,927 | 1/1985 | Bachmann et al. | 364/561 |
| 4,677,579 | 6/1987 | Radomilovich | 364/567 |
| 4,685,054 | 8/1987 | Manninen et al. | 364/191 |
| 5,019,761 | 5/1991 | Kraft | 318/568.11 |
| 5,048,293 | 9/1991 | Aoyagi | 60/420 |
| 5,128,599 | 7/1992 | Nikolaus et al. | 318/685 |

Primary Examiner—Bentsu Ro
Attorney, Agent, or Firm—Antonelli, Terry, Stout & Kraus

[57] ABSTRACT

A method of controlling an excavator driven by an electronic control system having an input/output board for executing a transformation, scaling and filtering function of signals supplied from a hydraulic control portion, a central processing unit for storing the data output of the input/output board into a specified area of a RAM and transferring the data stored in the RAM to a ROM and a multi-control valve for distributing the data in the RAM to each of control parts in the hydraulic control portion as control signals, comprises a step of arranging the data inputted through the input/output board into a data area A for a plurality of tasks 1 and 2, a step of processing the data in the data area A by using executive codes for the plurality of tasks 1 (B) and task 2 (C), a step of executing the tasks in correlation with a system library D after the data area processing step, and a step of transferring control signals to the control parts in the hydraulic control portion through an input/output driver and the input/output board after the completion of the tasks by using the multitasking operation system. The control parts in the hydraulic control portion are multitasked with an improved response speed for the tasks.

1 Claim, 3 Drawing Sheets time required for JOB1=50[ms]
time required for JOB2=60[ms]

METHOD OF CONTROLLING MULTITASKING EXCAVATOR SYSTEM

BACKGROUND OF THE INVENTION

1. Field of the Invention

The present invention relates to a method of controlling a multi-tasking excavator system, more particulary, to a method which is scheduled to enable urgent jobs to be quickly executed and in which a response speed of the system to the jobs is improved to achieve proper response required to perform the jobs.

2. Description of the Prior Art

In a conventional excavator control system, an electronic control device is employed to perform desired jobs in order.

With such an excavator control device, it is difficult to effectively process the jobs. Therefore, urgent jobs must be quickly effected or than a job presently being performed. As a result, according to such an excavator control device, performance of the entire system is substantially reduced. For that reason, the conventional control system has of the following drawbacks.

Firstly, delay in the response speed occurs and a control for the excavator is thus essentially unstable. Secondly, physical shock to the excavator is greatly increased because proper output power to a given input cannot be produced within a given time period. Therefore, the hydraulic discharging rate essential to the excavator in working may be unexpectedly changed. As a result, mechanical parts of the excavator are influenced by the increased physical shock. In FIG. 2, a portion ④ denotes the previously noted state. As seen from FIG. 2, in case of a single-task excavator system having a mechanism for the jobs generated, if the period of time between the generation and completion of the job is set 100 ms or less to produce a stable control of the entire system, a first job JOB1 is performed for the time duration ① of approx. 30 ms and a second job JOB2 sequentially generated is performed for the time duration ② of 60 ms. This job JOB2 is finished with the lapse of the period ②. Consequently, the first job JOB1 is restarted at a period ③. At this time, the previously set time of 100 ms has lapsed before the completion of the first job JOB1. Accordingly, an output signal produced at rest i.e., 10 ms of the set time cannot be employed as a control output or an unstable control output is produced.

SUMMARY OF THE INVENTION

Accordingly, an object of the present invention is to provide a method of controlling a multitasking excavator system, which is scheduled to enable urgency jobs to be quickly executed and to properly process time-limited jobs with a response speed of the system to the jobs being improved to acheive proper responsibile required to perform the jobs.

In order to achieve the above object, the present invention provides a method of controlling a multitasking excavator system driven by an electronic control system having an input/output board for executing a transformation, scaling and filtering function of signals supplied from a hydraulic control portion, a central processing unit for storing the data output of the input/output board into a specified area of a RAM and transferring the data stored in the RAM to a ROM and a multi-control valve for distributing the data in the RAM to each control part of the hydraulic control portion as control signals. The method contemplates an input/output board into the data area A for task 1 and task 2; a data area processing step of appropriately processing the data in the data area A by using excutive codes of the task 1 (B) and task 2 (C); a multitasking operation system step of executing the tasks in correlation with a system library D after the data area processing step; a system working area step of transferring appropriate control signals to the control parts in the hydraulic control portion through an input/output driver and the input/output board after the completion of the tasks by using the multitasking operation system. Accordingly, the control parts in the hydraulic control portion are multitasked with an improved response speed to the jobs.

The above and other abjects, features and advantages will be apparent from the following description taken with reference to the accompanying drawings.

DETAILED DESCRIPTION OF THE INVENTION

Thereinafter, the present invention will be described in detail.

Figure 1:
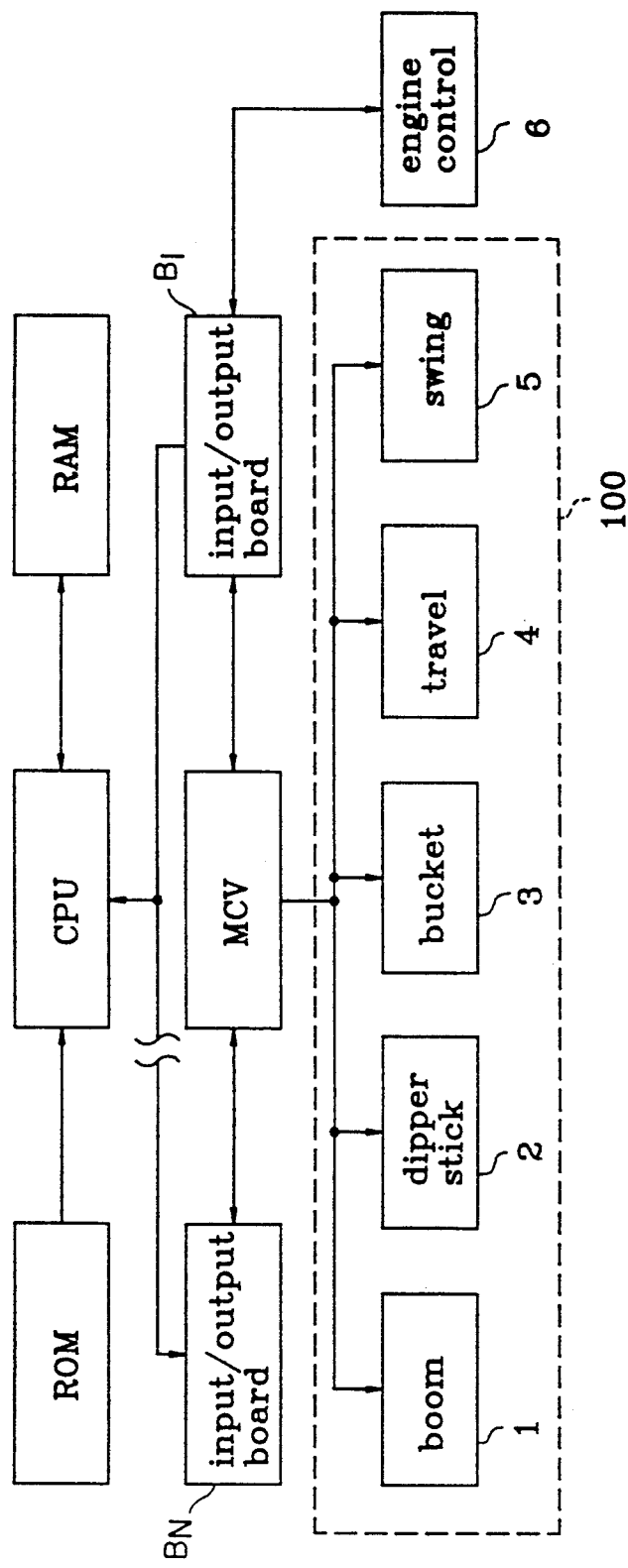
FIG. 1 is a block diagram of an electronic control system for a multitasking excavator containing the present invention.
Figure 2:
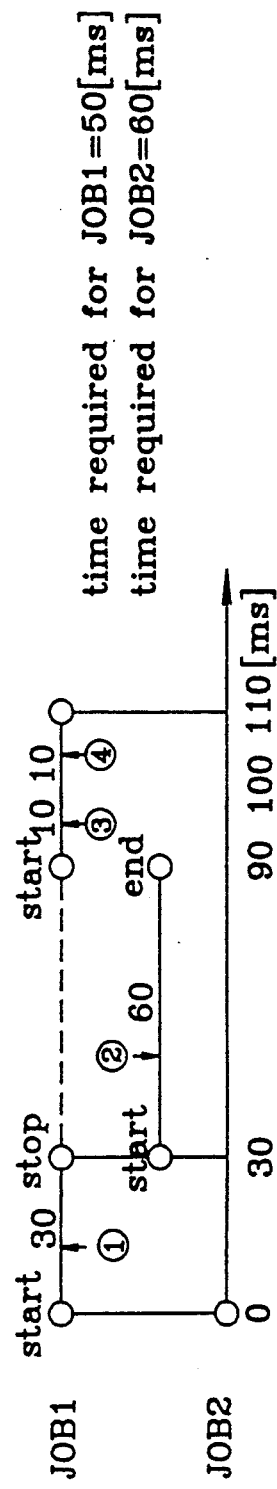
FIG. 2 is a block diagram of a conventional electronic control system for an excavator to which the present invention maybe applied.
Figure 3:
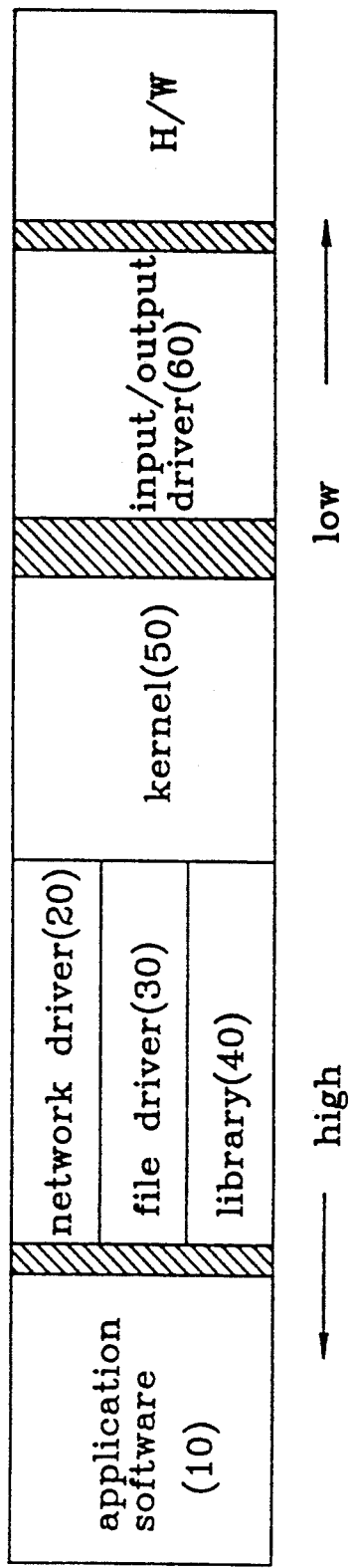
FIG. 3 shows a multitasking system employed in the present invention.

First, a multitasking system of the present invention is constructed on the basis of a multitasking operation system stored in a ROM in FIG. 1, which is referred to as O/S, as shown in FIG. 3.

In FIG. 3, 10 denotes an application software corresponding to the uppermost area in the present invention, and 60 denotes an input/output driver corresponding to the lowermost area of the present invention. These uppermost and lowermost areas are identified in accordance with the correlation to a hardware construction of the entire control part.

More specifically, the application software 10 is comprised of an entire excavator control system and includes a control procedure to produce porper control outputs to given input signals. When the control outputs are generated through a specified network, they are transferred to a multitasking kernel 50. On the contrary, when the control outputs are generated through a separate file system, they are transferred through a file driver to the multitasking kernel 50. Alternatively, various libraries which are not resident in the kernel are transferred through a library 40 to the multitasking kernel 50.

Figure 4:
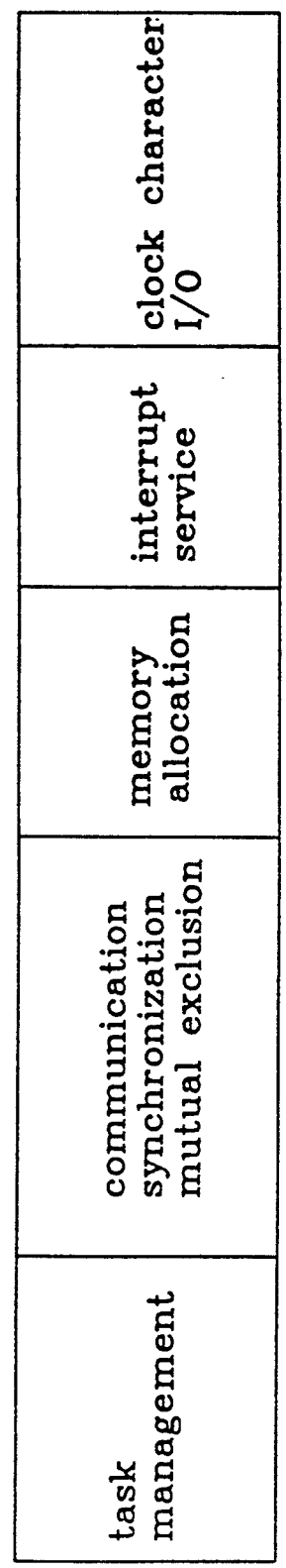
FIG. 4 shows a construction of a kernel of the multitasking system having multi-processing function.

The kernel 50 can use an input/output driver 60 in FIG. 3 to input or output data to a RAM and an input/output board $B_N$ through a central processing unit (CPU) in FIG. 1. In addition, the kernel 50 has multiple stages built therein, as shown in FIG. 4 and thus is constructed in an allowable multiprocessing format.

The multitasking system of the present invention is initiated when the control input signals are produced. First, data representing the operational result of an excavator hydraulic control circuit 100 including a boom 1, a dipper stick 2, a bucket 3, a travel 4 and a swing 5 is inputted to the input/output board I/O $B_1$ and then entered to the central processing unit CPU directly or through a multi-control valve MCV. Similarly, an engine control result is also inputted from the engine control portion 6 to the central processing unit CPU.

In this case, the input/output board I/O $B_1$ produces a transformation, scaling and filtering operation on the signal supplied from the hydraulic control circuit 100 and then stores the resultant data in an area of the RAM under a control of the central processing unit CPU.

The data stored in the RAM is scheduled into excavator control software by way of a multitasking O/S stored in the ROM. The scheduled data is transferred to the RAM under control of the CPU and then supplied through the input/output board I/O $B_N$ and the multicontrol valve MCV to the boom 1, dipper stick 2, bucket 3, travel 4 and swing 5 in the hydrulic control portion 100 so that multitasking control of the parts 1 to 5 are achieved.

Figure 5:
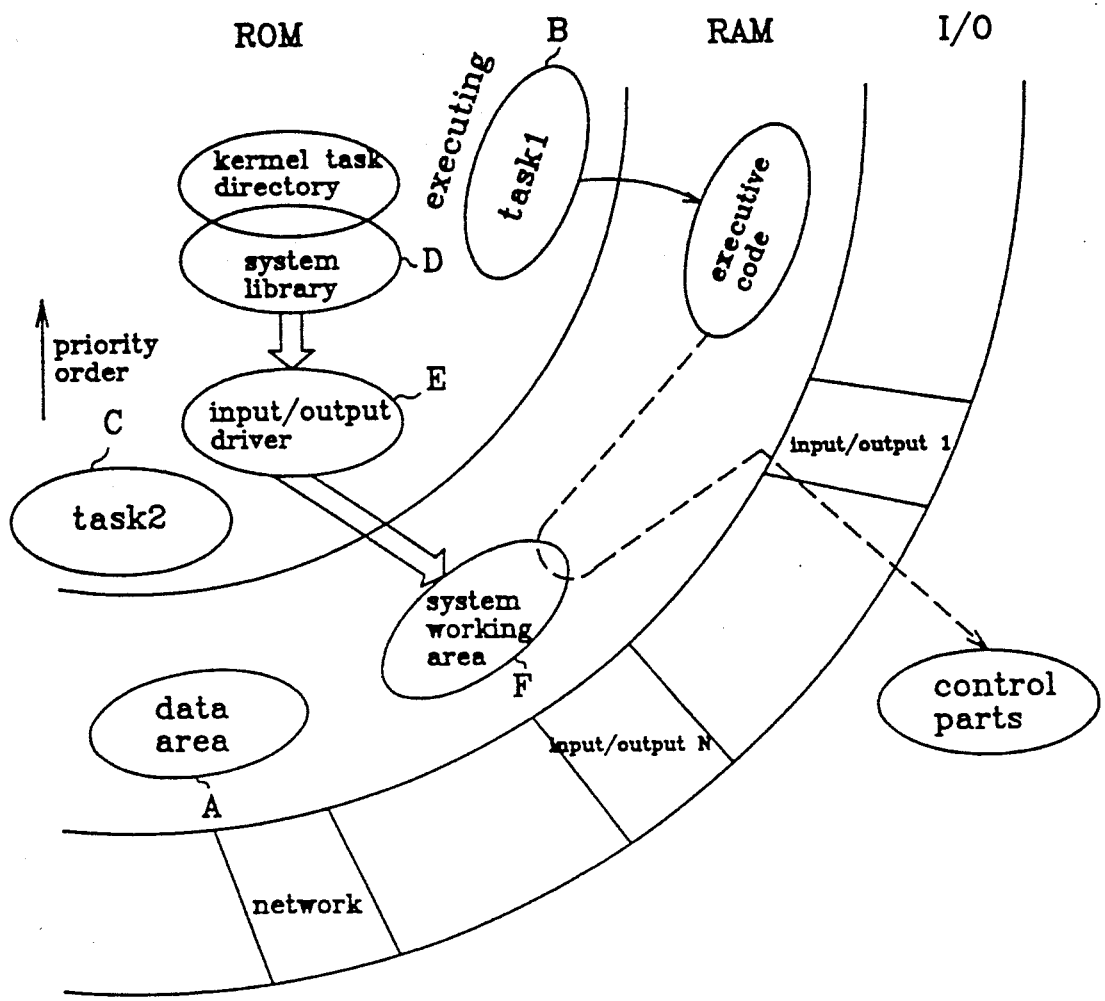
FIG. 5 shows a ROM and RAM in the multitasking system and an input/output control procedure according to the present invention; and, FIG. 6 is a view illustrating an example of the multitasking in accordance with the present invention.

With reference to FIG. 5, the data input through the input/output board I/O $B_1$ is positioned in the data area A for the first and second tasks TASK 1 and TASK 2 by a multitasking input/output driver. Consequently, the data areas A for the tasks 1 and 2 are properly processed by executive codes for the task 1 B and task 2 C. These tasks are performed in a correlative relation with the multitasking O/S. After the completion of the tasks, the resulting information is stored in the area A. At this time, the data in the system library D is transferred to the multicontrol valve MCV through an input/output driver E and a system working area F, that is, through the input/output board I/O $B_1$ of FIG. 1, so that the control signals are appropriately supplied to the boom 1, the dipper stick 2, the bucket 3, the travel 4 and the swing 5 in the hydraulic control circuit 100. As a result, the control processing of the parts 1 to 5 in the hydraulic control portion 100 can be in multitasking format.

Figure 6:
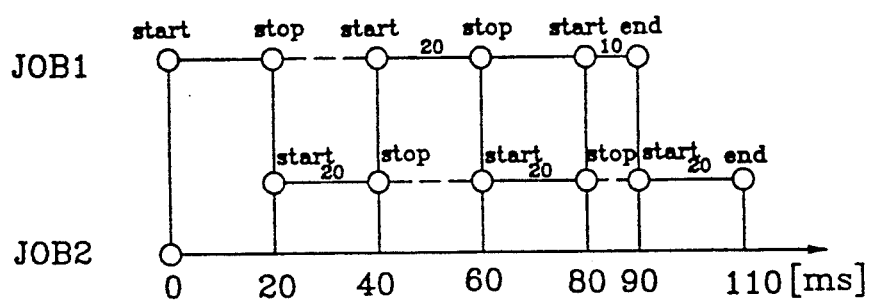

FIG. 6 is a view of an actual application of the present invention.

As seen from FIG. 6, assuming that the processing time between the start and end of each of jobs is set within the time duration of the 100 ms, and time period given to each of the jobs is 20 ms. Under these conditions, the first job JOB1 is initially performed for 20 msec and, after the lapse of 20 ms assigned to the job JOB1, the second job JOB2 is performed while job JOB1 is temporarily stopped. This state is stored in the ROM of FIG. 1. After processing of job JOB2 is performed for 20 ms, job JOB1 is restarted while job JOB2 is temporarily stopped. By the procedure thus executed, job JOB1 is executed for the time duration (i.e., 50 ms = 20+20+10) required to complete its execution and job JOB2 can be completely executed for a time duration of 60 ms (=20+20+20). Accordingly, the time required to perform job JOB1 is 90 ms (that is, actual working time required to perform 50 ms + waiting time 40 ms) and the time for job JOB2 is 90 ms (actual working time 60 ms + waiting time 30 ms).

As a result, the jobs JOB1 and JOB2 can be completely executed while satisfying the conditions previously set.

As described above, according to the present invention which can improve processing of given jobs by an existing electronic excavator control system, the jobs to be executed can be scheduled to be processed effectively, and time-limited jobs can be appropriately processed while the entire control system is thus stabilized. Furthermore, according to the present invention, the system can respond to the jobs in time with an improved response rate, and the present invention can be applied to other industrial applications having simultaneously time-limited jobs, similar to the present invention in content.

Although the present invention has been described with reference to the specified embodiment, it should be understood that many changes and modifications will be made therein without departing from the spirit and scope of the invention.

What is claimed is:

1. A method of controlling an excavator driven by an electronic control system having an input/output board for executing a transformation, scaling and filtering function of signals supplied from a hydraulic control portion, a central processing unit for storing a data output of the input/output board into a specified area of a RAM and transferring data stored in the RAM to a ROM, and a multicontrol valve for distributing the data in the RAM to each of control parts in the hydraulic control portion as control signals, the method comprising:

an input/output drive step of arranging data inputted through the input/output board into a data area for a plurality of tasks;

a data area processing step of processing the data in the data area by using executive codes for the plurality of tasks;

a multitasking operation system step of executing the plurality of tasks in correlation with a system library after the data area processing step; and, a system working area step of transferring control signals to the control parts in the hydraulic control portion through an input/output driver and the input/output board after completion of the plurality of tasks by using the multitasking operation system;

whereby the control parts in the hydraulic control portion are multitasked with an improved response speed for the plurality of tasks.

* * * * *